(12) United States Patent
Chun et al.

(10) Patent No.: US 8,709,600 B2
(45) Date of Patent: Apr. 29, 2014

(54) POLYMER-ENCAPSULATED COLORANT NANOPARTICLES

(75) Inventors: Doris Pik-Yiu Chun, Santa Clara, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 12/830,382

(22) Filed: Jul. 5, 2010

(65) Prior Publication Data
US 2012/0004345 A1 Jan. 5, 2012

(51) Int. Cl.
*C09C 3/10* (2006.01)
*C09D 11/00* (2014.01)

(52) U.S. Cl.
USPC .................. 428/402.24; 428/407; 106/31.65

(58) Field of Classification Search
USPC ................... 428/407, 402.24; 106/31.65
See application file for complete search history.

(56) References Cited

U.S. PATENT DOCUMENTS

| | | | | |
|---|---|---|---|---|
| 3,924,035 A * | 12/1975 | Miller | | 427/327 |
| 5,387,489 A | 2/1995 | Fuller et al. | | |
| 5,665,429 A * | 9/1997 | Elwakil | | 427/218 |
| 5,679,724 A | 10/1997 | Sacripante et al. | | |
| 5,969,003 A | 10/1999 | Foucher et al. | | |
| 6,051,060 A * | 4/2000 | Mizobuchi | | 106/499 |
| 6,053,438 A | 4/2000 | Romano, Jr. et al. | | |
| 6,399,701 B1 | 6/2002 | Enright et al. | | |
| 6,635,693 B2 * | 10/2003 | Wang et al. | | 523/211 |
| 7,094,830 B2 * | 8/2006 | Xue et al. | | 524/779 |
| 2002/0077384 A1 * | 6/2002 | Sano et al. | | 523/160 |
| 2008/0242774 A1 * | 10/2008 | Lahann et al. | | 524/99 |
| 2011/0269901 A1 * | 11/2011 | Chun et al. | | 524/590 |

FOREIGN PATENT DOCUMENTS

WO WO 02/46322 A2 6/2002
WO WO 2009070148 A1 * 6/2009

OTHER PUBLICATIONS

DuPont Nucrel Acid Copolymer Resins: Home Page, http://www2.dupont.com/Nucrel/en_US/, first accessed via web Jun. 3, 2010, 2 pages.
Honeywell Additives Products—A-C Performance Additives, http://www51.honeywell.com/sm/acwax/products.html, first accessed via web Jun. 3, 2010, 4 pages.
Park, J.H., et al., Current Applied Physics, 7 (2007) 349-351.
Yu, D.G., et al., Colloids and Surfaces A: Physicochem. Eng. Aspects, 237 (2004) 87-93.
Vestal, C.R., et al., J. Am. Chem. Soc. 2002, 124, 14212-14313.
Mahdavian, A.R. et al., Polym. Bull., (2009) 63:329-340.

* cited by examiner

*Primary Examiner* — Vickey Nerangis

(57) ABSTRACT

A polymer-encapsulated colorant nanoparticle includes a colorant nanoparticle core, and a polymer coating established on the colorant nanoparticle core. A negatively chargeable functional group is present on a surface of the polymer-encapsulated colorant nanoparticle.

11 Claims, 3 Drawing Sheets

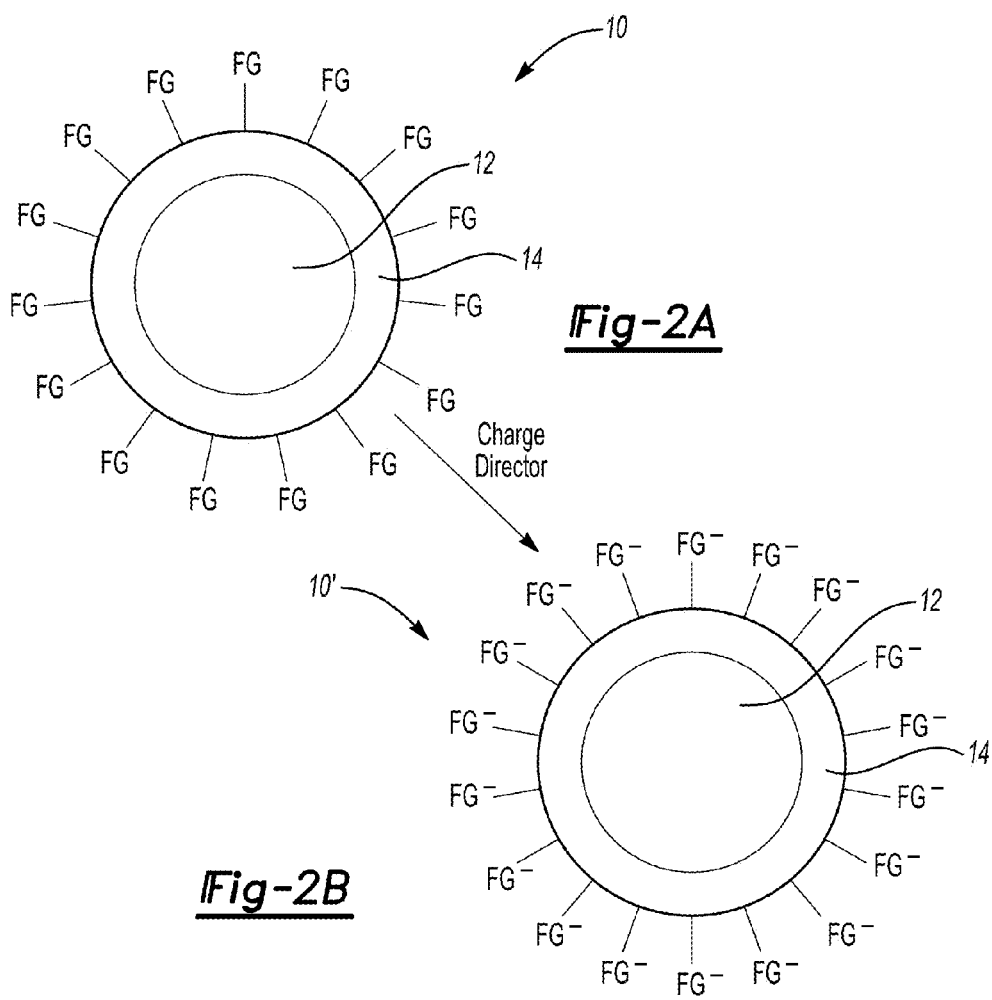
*Fig-2A*
*Fig-2B*
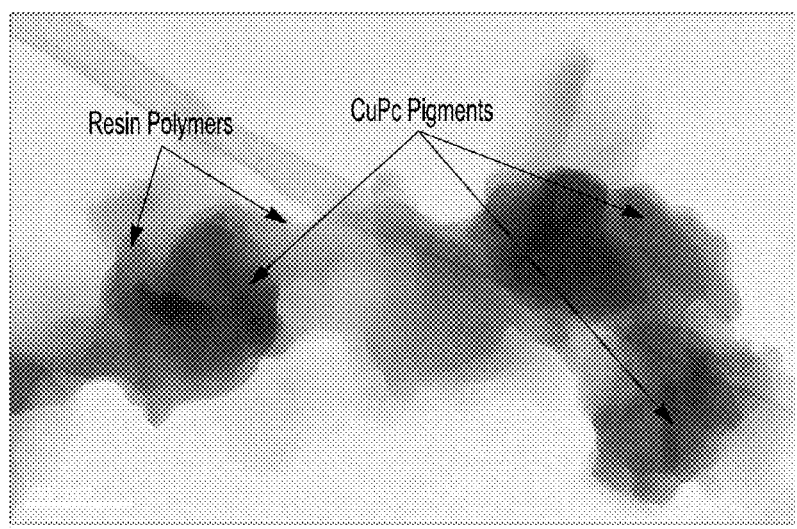
*Fig-3A*

POLYMER-ENCAPSULATED COLORANT NANOPARTICLES

BACKGROUND

The present disclosure relates generally to polymer-encapsulated colorant nanoparticles.

Encapsulated particles have become increasingly useful in a variety of biological applications (e.g., drugs, cosmetics, etc.), printing applications (e.g., laser printing, digital commercial printing, etc.), and electronic applications (e.g., electronic inks, light emitting polymers, e-field displays, etc.). Such particles have been produced using a variety of methods often requiring additional tools and/or process steps.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 2A and 2B schematically depict an embodiment of a polymer-encapsulated colorant nanoparticle after being formed via the process shown in FIG. 1 (see FIG. 2A) and after the introduction of a charge director (see FIG. 2B);

FIGS. 3A and 3B are high-resolution transmission electron micrograph (HRTEM) images of embodiments of the polymer-encapsulated colorant nanoparticles.

DETAILED DESCRIPTION

Embodiment(s) of the polymer-encapsulated colorant nanoparticles disclosed herein include a polymer coating established on a colorant nanoparticle core. These polymer-encapsulated colorant nanoparticles may be formed directly in non-water (i.e., non-aqueous) based carriers, and thus are suitable for many applications, including those that involve electrophoretic movement as the primary driving mechanism, such as liquid electrophotographic printing, electrophoretic displays, electrophoretic imaging, or the like. The polymer-encapsulated nanoparticles in the non-water based carriers may also be used as inkjet inks. In particular, the ink containing the carrier, dispersant, and encapsulated particles is printable via a piezoelectric printhead. The ink can also include a nucleation agent, rendering it printable via a thermal inkjet printhead.

The process disclosed herein for forming embodiments of the polymer-encapsulated colorant nanoparticles uses polymer resin(s) as starting materials. This is in contrast to processes that use monomers or prepolymers as starting materials, and then polymerize the monomers or prepolymers. The use of preformed polymers in the embodiments disclosed herein provides an avenue to create encapsulated colorants with polymers whose monomers cannot readily adapt to an emulsion process. Furthermore, the polymer resin(s) create discrete polymer matrices that provide a structural network suitable for encapsulating the colorant nanoparticle cores. When the polymer-encapsulated nanoparticles are included in inks, the polymer matrices enhance the durability of a print formed with the ink and also suppress undesirable effects that can otherwise result from exposure of the colorants (e.g., chemical and/or physical deterioration caused, for example, from oxidation, exposure to moisture, scratching, and rub or highlighter smearing).

As briefly mentioned, the process disclosed herein for forming embodiments of the polymer-encapsulated colorant nanoparticles also uses non-aqueous carriers. The polymer-encapsulated colorant nanoparticles are formed in situ (for instance, in a single container) in the non-aqueous carrier, and thus solvent exchange and/or re-dispersion is unnecessary. The in situ method also advantageously reduces the amount of equipment and/or process steps needed to ultimately form the encapsulated nanoparticles. This renders the process relatively cost effective and efficient in both energy and time.

Figure 1:
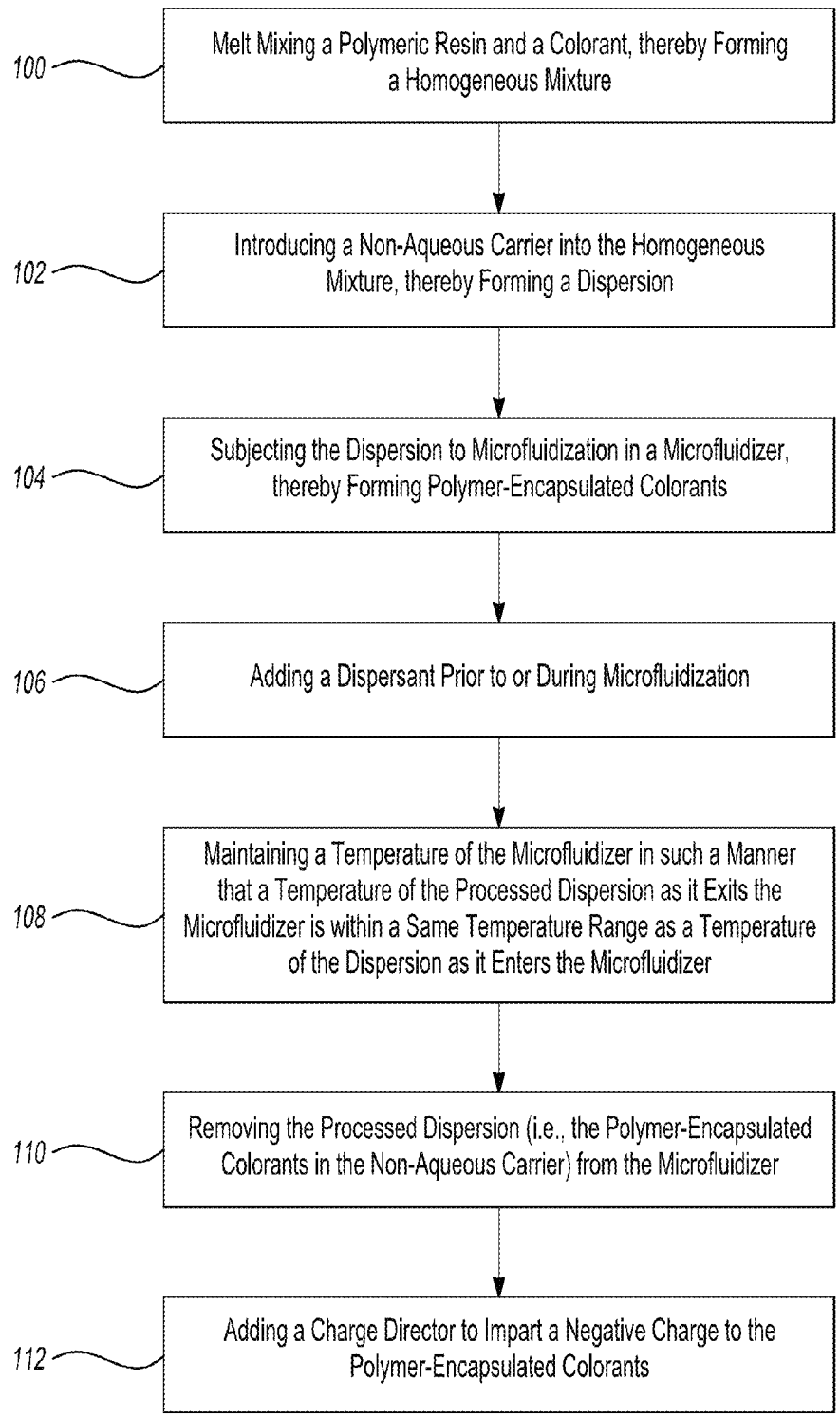
FIG. 1 is a flow diagram depicting an embodiment of a method for forming an embodiment of a polymer-encapsulated colorant nanoparticle.

Embodiments of the process or method for forming embodiments of the polymer-encapsulated colorant nanoparticles (shown at reference numerals 10 and 10' in FIGS. 2A and 2B) are depicted in FIG. 1. As shown at reference numeral 100, the process begins by melt mixing at least one polymer resin with at least one colorant to form a homogeneous mixture. As used herein, the phrase "homogeneous mixture" means that the mixture appears to the naked eye to be a uniform composition of the colorant in the polymer resin.

It is to be understood that one or more polymer resins and one or more colorants may be selected to form the homogeneous mixture. As previously mentioned, the polymer resins are preformed polymers. Examples of suitable preformed polymers include copolymers of ethylene and methacrylic acid, copolymers of ethylene and acrylic acid, terpolymers of ethylene, methacrylic acid, and acrylate, polyethylene homopolymers, oxidized polyethylene homopolymers, high-density oxidized polyethylene homopolymers, polypropylene homopolymers, copolymers of ethylene and vinyl acetate, copolymers of oxidized ethylene and vinyl acetate, ethylene maleic anhydride copolymers, propylene maleic anhydride copolymers, polyolefin waxes, and combinations thereof.

Examples of commercially available copolymers of ethylene and methacrylic acid (available from E.I. DuPont de Nemours & Co., Inc., Wilmington, Del.) include, but are not limited to, NUCREL® 0403 (nominally about 4 wt % methacrylic acid), NUCREL® 0902 (nominally about 9 wt % methacrylic acid), NUCREL® 0910 (nominally about 9 wt % methacrylic acid), NUCREL® 0407HS (nominally about 4 wt % methacrylic acid), NUCREL® 0903 (nominally about 9 wt % methacrylic acid), NUCREL® 0910HS (nominally about 9 wt % methacrylic acid), NUCREL® 0411HS (nominally about 4 wt % methacrylic acid), NUCREL® 0903HC (nominally about 9 wt % methacrylic acid), NUCREL® 1202HC (nominally about 11.5 wt % methacrylic acid), NUCREL® 0609HSA (nominally about 6.5 wt % methacrylic acid), NUCREL® 0908HS (nominally about 9.2 wt % methacrylic acid), NUCREL® 1214 (nominally about 12 wt % methacrylic acid), NUCREL® 599 (nominally about 10 wt % methacrylic acid), NUCREL® 699 (nominally about 11 wt % methacrylic acid), NUCREL® 2940 (nominally about 19 wt % methacrylic acid), NUCREL® 960 (nominally about 15 wt % methacrylic acid), and NUCREL® 925 (nominally about 15 wt % methacrylic acid). Some non-limiting examples of commercially available copolymers of ethylene and acrylic acid (available from DuPont) include NUCREL® 3990 (nominally about 9 wt % acrylic acid), NUCREL® 30907 (nominally about 9 wt % acrylic acid), NUCREL® 3990L (nominally about 9 wt % acrylic acid), NUCREL®

31001 (nominally about 9.5 wt % acrylic acid), NUCREL® 30705 (nominally about 7 wt % acrylic acid), and NUCREL® 30707 (nominally about 7 wt % acrylic acid). Other non-limiting examples of commercially available copolymers of ethylene and acrylic acid (available from Honeywell International, Inc., Morristown, N.J.) include A-C® 540 (nominally about 0.1 wt % acrylic acid), A-C® 540A (nominally about 0.1 wt % acrylic acid), A-C® 580 (nominally about 0.1 wt % acrylic acid), A-C® 5120 (nominally about 0.1 wt % acrylic acid), and A-C® 5180 (nominally about 0.1 wt % acrylic acid). One example of a commercially available terpolymer of ethylene, methacrylic acid, and acrylate is NUCREL® AE from Dupont.

Some non-limiting examples of polyethylene homopolymers include A-C® 3A, A-C® 6, A-C® 6A, A-C® 6S, A-C 7, A-C® 7A, A-C® 7S, A-C® 8, A-C® 8A, A-C® 9, A-C® 9A, A-C® 9CF, A-C® 9F, A-C® 9W, A-C® 15, A-C® 16, A-C® 16A, A-C® 617, A-C® 617A, A-C® 617G, A-C® 617FGA, A-C® 715, A-C® 725, A-C® 735, A-C® 810A, A-C® 820A, and A-C® 1702 (all of which are commercially available from Honeywell). Suitable commercially available oxidized polyethylene homopolymers include A-C® 673P, A-C® 680, A-C® 655, A-C® 629, A-C® 629A, A-C® 656, and A-C® 6702 (all of which are available from Honeywell). Some high-density (≥0.98 g/cc) oxidized polyethylene homopolymers that may be used in the embodiments disclosed herein include A-C® 307, A-C® 307A, A-C® 316, A-C® 316A, A-C® 325, A-C® 392, A-C® 330, A-C® 395, and A-C® 395A (all of which are available from Honeywell). Polypropylene homopolymers that may be used include, but are not limited to A-C® 1754, A-C® 1660, and A-C® 1089 (all of which are available from Honeywell).

Examples of commercially available copolymers of ethylene and vinyl acetate (available from Honeywell) include, but are not limited to, A-C® 405T, A-C® 405M, A-C® 405S, A-C® 400, A-C® 400A, A-C® 415, and A-C® 430; and one example of a commercially available copolymer of oxidized ethylene and vinyl acetate (available from Honeywell) includes, but is not limited to A-C® 645P.

As previously mentioned, the polymer resin(s) may also be selected from ethylene maleic anhydride copolymers and/or propylene maleic anhydride copolymers. Non-limiting examples of ethylene maleic anhydride copolymers include A-C® 575A, A-C® 575P, A-C® 573A, and A-C® 573P (all of which are available from Honeywell); and non-limiting examples of propylene maleic anhydride copolymers include A-C® 597A, A-C® 597P, A-C® 907P, A-C® 596A, A-C® 596P, A-C® 950P, and A-C® 1325P (all of which are available from Honeywell).

Suitable polyolefin waxes (i.e., polyolefins having wax-like characteristics) include oxidized polyethylene waxes (e.g., ACUMIST® A-5, ACUMIST® A-6, ACUMIST® A-12, ACUMIST® A-18, ACUMIST® A-45, ACUMIST® 1812, and ACUMIST® 1813), polyethylene waxes (e.g., ACUMIST® B-4, ACUMIST® B-6, ACUMIST® B-9, ACUMIST® B-12, ACUMIST® B-18, ACUMIST® C-3, ACUMIST® C-5, ACUMIST® C-12, and ACUMIST® C-18, ACUMIST® D-5, and ACUMIST® D-9), polypropylene waxes (e.g., ACUMIST® 1688 and ACUMIST® 1722), polytetrafluoroethylene (PTFE) modified polyethylene waxes (e.g., ACUMIST® 3105B and ACUMIST® 3205B), Fisher Tropsch waxes (e.g., ACUMIST® 1814, ACUMIST® 1306, ACUMIST® 1106, ACUMIST® 1204, and ACUMIST® 1112), and ethene and amide waxes (e.g., ACUMIST® 1528). All of the listed ACUMIST® waxes are commercially available from Honeywell.

Ethylene-acrylic acid cationomers may also be used as the polymer resin. Non-limiting examples of suitable ethylene-acrylic acid cationomers include those available from Honeywell in the ACLYN® low molecular weight ionomer series, such as ethylene-acrylic acid calcium ionomers (e.g., ACLYN® 201 and ACLYN® 201A), ethylene-acrylic acid zinc ionomers (e.g., ACLYN® 288 to 299, ACLYN® 288A to 299A, ACLYN® 288P to 299P, ACLYN® 351, ACLYN® 351A, and ACLYN® 351P), ethylene-acrylic acid magnesium ionomers (e.g., ACLYN® 230 to 259 and ACLYN® 230A to 259A), and ethylene-acrylic acid sodium ionomers (e.g., ACLYN® 285 and ACLYN® 285A).

In one embodiment, the glass transition temperature ($T_g$) of the selected polymer resin(s) ranges from about 50° C. to about 95° C.

The colorant nanoparticle core(s) are selected from pigment particles (e.g., organic or inorganic particles), quantum dots, colloidal particles (e.g., metal colloids), and combinations thereof. Any dye that can be dissolved in the selected resin(s) can also be selected as the colorant nanoparticle core(s). The nanoparticle cores are spherically/substantially spherically shaped, where each has an initial size (i.e., diameter) ranging from about 10 nm to about 250 nm. In a non-limiting example, the average size of the nanoparticle cores is about 150 nm. It is to be understood, however, that the size of the nanoparticle cores depends, at least in part, on the material selected for such particles. It is to be further understood that the size of the polymer-encapsulated colorant nanoparticle 10, 10' is dependent on the materials used and the operation conditions, and is less than or equal to 5 microns. Theoretically, the size of the encapsulated particles cannot be smaller than that of the colorant's primary particle size (e.g., ranging from 10 nm to 250 nm). However, while microfluidization may reduce the primary particle size, the addition of the polymer resin coating to the colorant results in the size (i.e., diameter) of the polymer-encapsulated nanoparticle 10, 10' ranging from about 20 nm to about 1000 nm. In another non-limiting example, the size of the polymer-encapsulated colorant nanoparticle 10, 10' ranges from about 200 nm to about 500 nm, ±100 nm. It is to be understood that the final size of the polymer-encapsulated colorant nanoparticle 10, 10' will also depend, at least in part, upon the dispersant that is used in the process.

Organic or inorganic pigment particles may be selected from, but are not limited to, black pigment particles, yellow pigment particles, magenta pigment particles, red pigment particles, cyan pigment particles, blue pigment particles, green pigment particles, orange pigment particles, brown pigment particles, violet pigment particles, and white pigment particles. In some instances, the organic or inorganic pigment particles may include spot-color or specialty pigment particles. Spot-color pigments are formed from a combination of a predefined ratio of two or more primary color pigment particles. Specialty pigments may, e.g., be metallic, fluorescent and/or opalescent pigments. Two or more different kinds of pigments may be used in the embodiments disclosed herein.

Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, XPB-306, PRINTEX® 25, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Some non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Non-limiting examples of suitable magenta or red organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60. Suitable inorganic blue or cyan pigments include, but are not limited to, copper phthalocyanine particles (e.g., HALIOGEN® Blue D7079 (BASF Corporation).

Non-limiting examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

In another embodiment, the pigment may be selected from metallic pigments. Suitable metallic pigments include, but are not limited to, a metal selected from gold, silver, platinum, nickel, chromium, tin, zinc, indium, titanium, copper, aluminum, and alloys of any of these metals. These metals may be used alone or in combinations with two or more metals or metal alloys. Non-limiting examples of metallic pigments include Standard RO100, Standard RO200, and DORADO PX™ 4001 (available from Eckart Effect Pigments, Wesel, Germany).

In yet another embodiment, the pigment may be selected from a pearlescent pigment (also known as an opalescent pigment). It is to be understood that suitable pearlescent pigments are those that tend to exhibit various colors depending on the angle of illumination and/or of viewing. Non-limiting examples of pearlescent pigments include those of the PRESTIGE® series and of the DORADO PX™ series, both of which are available from Eckart Effect Pigments.

Examples of other suitable inorganic pigments include metal oxide pigments, such as iron oxide pigments (e.g., ferric oxide pigment particles), titanium oxide pigments (e.g., titanium dioxide pigment particles), or the like. An example of another suitable inorganic pigment includes cadmium selenide pigment particles.

The amount of polymer resin(s) and colorant(s) used will vary depending upon size of the batch that is to be made. In one embodiment, the ratio of polymer resin(s) to colorant(s) is 5:1. More generally, the ratio of polymer resin(s) to colorant(s) ranges from 20:1 to 4:1. When mixed with the non-aqueous carrier/vehicle, the amount of polymer resin(s) and colorant(s) is sufficient to generate the polymer-encapsulated colorant nanoparticles 10 such that the loading of the polymer-encapsulated colorant nanoparticles 10 in the non-aqueous carrier ranges from about 2% of the total solids to about 25% of the total solids.

To generate the homogeneous mixture, the polymer resin(s) and the colorant(s) are first added into a single container (e.g., a heat-proof container). In one embodiment, the polymer resin(s) and colorant(s) may be added to the container together, and then heated to the highest melting temperature of the selected resin(s). In another embodiment, polymer resin(s) are added to the container and heated to the highest melting temperature of the selected resin(s), and then once melting is achieved, the colorant(s) are added to the container. When heating to "the highest melting temperature" of the selected resin(s), it is to be understood that if two polymer resins having different melting points are selected, the higher melting temperature is used during the melt mixing step in order to ensure melting of both polymer resins. Heating may be accomplished without stirring for a predetermined time in order to melt the polymer resin(s) before trying to mix the colorants therein.

After melting is initiated or complete, and while heat is still applied, it is desirable to stir the components in order to agitate the melting or melted solids to generate the homogeneous mixture. Stirring may be accomplished at a rate up to 20 rpm. In some non-limiting examples, stirring is accomplished at a rate ranging from about 1 rpm to about 10 rpm, or from about 1 rpm to about 5 rpm. The time for stirring will depend, at least in part, upon the mixing rate. For example, a higher stirring rate may result in less stirring time needed to achieve the homogeneous mixture. Generally, stirring is continued until the homogeneous mixture is obtained. In one embodiment, stirring equipment may be incorporated in the single container. In another embodiment, when stirring equipment is not incorporated in the single container, the single container may be placed into a heated bath (e.g., at a temperature that is 10° C. to 20° C. above the highest resin melting point) and stirred. For example, the single container may be placed into a heated vessel equipped with an overhead mechanical stirrer and agitated until the homogeneous mixture is obtained.

As shown at reference numeral 102 of FIG. 1, once the homogeneous mixture is obtained, the non-aqueous carrier is introduced into the single container. The non-aqueous carrier may be selected from dielectric liquids, non-oxidative water immiscible liquids (e.g., petroleum distillates), or other organic liquids. In one non-limiting example, the non-aqueous carrier is an isoparaffinic hydrocarbon (such as those in the ISOPAR® series available from Exxon Mobil Corp., Houston, Tex.). In other non-limiting examples, the non-aqueous carrier includes linear, branched, or cyclic hydrocarbons (such as n-hexanes, heptanes, octane, cyclohexane, dodecane) or mixtures thereof, soy bean oil, vegetable oil, or plant extracts. The amount of non-aqueous carrier used depends upon the amount of polymer resin(s) and colorant(s) used. Generally, the amount of carrier used is sufficient to form a dispersion of the homogeneous mixture in the non-aqueous carrier. In one embodiment, the ratio of carrier to homogeneous mixture (of resin(s) and colorant(s)) is up to 3:1 (i.e., up to 75% carrier and up to 25% homogeneous mixture).

When the non-aqueous carrier is added, the contents are stirred at a rate ranging from about 350 rpm to about 500 rpm. Stirring is accomplished in order to evenly disperse the homogeneous mixture throughout the non-aqueous carrier. The time for stirring may vary, and it is to be understood that stirring is continued until the dispersion appears to be homogeneous. The temperature of the contents is maintained or increased during stirring. As such, the temperature at this point in the process is at or above the highest melting temperature of polymer resin(s) used. Once the dispersion is obtained, the temperature of the dispersion is reduced to i) within 30° C. below the effective freezing point of the polymer resin(s) (i.e., the definite freezing point of one polymer resin, or the composite freezing point of a mixture of polymer resins as determined by differential scanning calorimetry (DSC)), and in one embodiment, within 20° C. below the effective freezing point, and/or ii) at or above the lowest Vicat softening point of the resin(s). The parameters for determining the dispersion temperature will thus depend, at least in part, upon the polymer resin(s) used. For example, if a mixture of polymer resins is used, and one of the resins has a definite melting point while the other resin has no definite melting point, the dispersion temperature will be below the melting/freezing temperature of the one polymer resin and above the Vicat of the other polymer resin. As another example, if a polymer resin is used that has a freezing point of 70° C., the dispersion temperature is reduced to a temperature ranging from 40° C. to 70° C. In one embodiment, the dispersion temperature is reduced to any temperature from 30° C. to 60° C. In another embodiment, the dispersion temperature is reduced to any temperature from 40° C. to 50° C.

In the embodiments disclosed herein, a condenser may be used to collect vaporized carrier.

The dispersion is then subjected to microfluidization in a microfluidizer, as shown at reference numeral 104 of FIG. 1. The microfluidizer may be selected depending upon the desirable properties of the encapsulated nanoparticles in the non-aqueous carrier. As one example, a Y-shaped microfluidizer may be used when a substantially uniform particle size distribution is desired and/or when substantially uniform mixing is desired. In one embodiment, the uniform particle size distribution includes particles having an average size ranging from 150 nm to 500 nm, +/−100 nm. The Y-shaped microfluidizer may be particularly suitable when at least two different colorants (e.g., primary and secondary colorants of the same color, or colorants of different colors) are used because the shape of the microfluidizer diverts the flow into two streams and then brings the two streams back together. This flow promotes a more homogeneous distribution of the different encapsulated colorants in the final product. As another example, a Z-shaped microfluidizer may be used when a reduced size of the encapsulated nanoparticles is desired. The Z-shaped microfluidizer has a back wall, and when the dispersion hits this back wall, the colorants readily decrease in size. Suitable microfluidizers are available from a variety of manufacturers, including Microfluidics (e.g., the M-700 series).

Since microfluidization does not involve physical free moving parts, the number of exposed and un-capped or partially-capped colorant nanoparticles in the processed dispersion is significantly reduced, for example, compared to when direct milling processes are used.

Prior to or during microfluidization, a dispersant is added to the dispersion (see reference numeral 106 of FIG. 1). The dispersant enhances the stability of the resulting product (i.e., the encapsulated nanoparticles in the non-aqueous carrier). When added prior to microfluidization, the dispersant may be added while the dispersion is being stirred. When added during microfluidization, the dispersant may be dissolved in a suitable amount of the non-aqueous carrier and added to the processing dispersion. The amount of the dispersant that is added ranges from about 0.25 wt. % to about 100 wt. % of the total non-volatile solids present. In one non-limiting example, the dispersant is present in an amount of about 10 wt. %.

The dispersants may be selected from anionic dispersants, cationic dispersants, amphoteric dispersants, non-ionic dispersants, polymeric dispersants, oligomeric dispersants, or combinations thereof. Examples of anionic dispersants include sulfosuccinic acid and derivatives thereof, such as, for instance, metal (i.e., any metal in the first two columns of the periodic table) salts of succinate (e.g., dioctyl sodium sulfosuccinate (AOT)), or alkyl sulfosuccinates (such as GEROPON® SBFA-30 and GEROPON® SSO-75, both of which are manufactured by Rhodia, Boulogne-Billancourt, France), or docusate sodium. Examples of cationic dispersants include quaternary amine polymers, protonated amine polymers, polymers containing aluminum (such as those that are available from Lubrizol Corp., Wickliffe, Ohio), SOLSPERSE® 19000 (Lubrizol Corp.), and other like cationic dispersants. Amphoteric dispersants include those that contain compounds having protonizable groups and/or ionizable acid groups. Non-limiting examples of suitable amphoteric dispersants include lecithin and choline (e.g., dipalmitoyl-phosphatidyl-choline (DPPC)). Examples of non-ionic dispersants include, but are not limited to oil-soluble polyesters, polyamines, polyimines, polyamides, polyurethanes, polyacrylates, polymethacrylates (such as, e.g., SOLSPERSE® 3000 (Lubrizol Corp.), SOLSPERSE® 21000 (Lubrizol Corp.), or the like). Non-limiting examples of oligomeric dispersants include low average molecular weight (i.e., less than 1000) non-ionic dispersants.

During microfluidization, it is to be understood that the method includes controlling both the pressure and the temperature. The pressure inside the microfluidizer is initially low (e.g., 2,000 psi). The internal pressure (i.e., the fluid sheer pressure) is increased as the microfluidic processing continues. The maximum internal pressure is about 40,000 psi. In one embodiment, the external pressure gauge is set so that a desirable internal pressure will be obtained, and the microfluidizer automatically gradually increases to the set pressure. For example, the external pressure gauge may be set at 80 psi (corresponding to an internal/fluid sheer pressure of 26,000 psi) at the beginning of microfluidization, and as the process continues, the pressure will automatically gradually increase until 80 psi/26,000 psi is obtained. Then, this pressure will be maintained until microfluidization is complete. In another embodiment, the external pressure gauge is manually increased over time in order to gradually increase the internal pressure.

It is also desirable to maintain the relatively low temperature (i.e., 10° C. to 40° C.) of the dispersion throughout microfluidization (see reference numeral 108 of FIG. 1). In particular, the temperature of the dispersion as it enters the microfluidizer should be within the same temperature range as the temperature of the processed dispersion (i.e., the encapsulated particles in the non-aqueous carrier) as it exits the microfluidizer. As such, the temperature of the dispersion is maintained within the 10° C. to 40° C. window before, during, and after microfluidization. Maintaining the temperature during microfluidization may be accomplished by externally cooling the microfluidizer. In one embodiment, external cooling is accomplished using a heat exchanger in cooling loop. The heat exchanger temperature is maintained to within 10° C. below the flow temperature used. For example, if the lowest freezing point of the polymer resin(s) is 70° C., the flow temperature is maintained at 50° C., and the heat exchanger temperature is maintained within 45° C. to 48° C. In another embodiment, external cooling is accomplished by submerging the microfluidizer in a cooling bath having a temperature ranging from 0° C. to 10° C. In one non-limiting example, the cooling bath is maintained at a temperature of about 5° C.

Microfluidization may continue for any length of time until the desired particle size is achieved. To determine the particle size throughout microfluidization, samples may be taken while microfluidization is taking place. The samples are exposed to dynamic light scattering (DLS) analysis in order to evaluate the particle size distribution. Generally, longer microfluidization processing times result in smaller particles. Optimizing the process parameters (e.g., temperature, pressure, time etc.) allows for the production of a stable dispersion consisting of encapsulated nanometer-sized colorant particles.

In one embodiment of the method, a nucleation agent may be added to the ink. A non-limiting example of the nucleation agent is isopropyl alcohol. The addition of the nucleation agent renders the ink more suitable for being printed using thermal inkjet applications. The nucleation agent can be added during ink formulation, for example, when other additives, such as biocides and/or co-solvents, are added to the carrier containing the polymer-encapsulated particles. The loading of the nucleation agent ranges from about 0.5 wt % to about 10 wt % of the total ink composition.

Once the microfluidization is complete, the processed dispersion is removed from the microfluidizer (see reference numeral 110 of FIG. 1). The processed dispersion includes the non-aqueous carrier having the encapsulated colorant nanoparticles 10 and dispersant therein. A schematic depiction of one encapsulated colorant nanoparticle 10 is shown in FIG. 2A. As illustrated, the encapsulated nanoparticle 10 includes the nanoparticle core 12 and the polymer coating 14 thereon. The polymer coating 14 forms a shell that houses the nanoparticle core 12. In some instances, the coating 14 is actually permanently established on the nanoparticle core 12. It is to be understood that the term "permanent," as used in reference to the establishment of the coating 14 on the nanoparticle core 12, refers to non-reversible encapsulation of the nanoparticle core 12 with the coating 14 (i.e., the polymers permanently remain on the surface of the nanoparticle core 12). This is in contrast to thermodynamically reversible coatings such as, e.g., those formed in self-assembling processes. The permanent establishment may be accomplished via covalent bonding when the polymer(s) chemically react with the nanoparticle core 12. The polymer coating 14 may otherwise be attached to the nanoparticle core 12 through physical bonding, such as, e.g., through hydrogen bonding, Van der Waals interactions, Zwitterionic interactions, or the like.

The process disclosed herein (see reference numerals 100 through 110) can be accomplished in the absence of a charge director or charge controlling agent. As such, the resulting encapsulated colorant nanoparticles 10 have uncharged functional groups FG at the surface of the polymer coating 14 (see FIG. 2A). These uncharged functional groups FG are capable of being negatively charged by adding a charge director to the processed dispersion (see reference numeral 112 of FIG. 1). FIG. 2B illustrates the encapsulated colorant nanoparticles 10' after the addition of a charge director. As shown, the functional groups FG become negatively charged. For example, a COOH functional group would become COO— upon the addition of the charge director. Other negatively chargeable functional groups FG include sulfonate, sulfate, amide, carbonate, phosphate, phosphonate, or boronate. The charge director loading ranges from 0.01 wt % to 5 wt %, and in some embodiments from 0.1 wt % to 1 wt %. Examples of suitable charge directors include SOLSPERSE® 9000, 13940, and 2155 (Lubrizol Corp.) or OLOA 11000 and 12000.

In another embodiment, it may be desirable to add the charge director during the process. This will result in polymer-encapsulated negatively charged particles.

To further illustrate embodiment(s) of the present disclosure, the following example is given herein. It is to be understood that this example is provided for illustrative purposes and is not to be construed as limiting the scope of the disclosed embodiment(s).

EXAMPLE

The following example was performed at the laboratory scale. However, it is to be understood that the method(s) disclosed herein may be scaled up.

Two resins (1.34 g of resin Honeywell's A-C® 580 and 5.36 g of resin Dupont's NUCREL® 599) were added to a 500 mL Morton type flask with 1.34 g of copper phthalocyanine (CuPc) pigment. The flask was then placed in a vacuum oven at 100° C. overnight. The resulting melted polymers were subsequently stirred together with the pigment at an elevated temperature (130° C.) to form a pigment/polymer paste (i.e., the homogeneous mixture). 200 mL of ISOPAR® L (Exxon Mobile) was then introduced to the homogeneous mixture. The flask was submerged in an oil bath at a temperature of 120° C. for 3 hours with stirring via a magnetic stir bar at 250 rpm. Submersion was accomplished such that none of the contents of the oil bath contacts the contents within the flask. Heating and stirring was continued until a homogenously suspended dispersion was obtained.

The suspension was passed through a microfluidizer (model 110Y by Microfluidics), which was equipped with an 87 micron interaction chamber. The homogenizer was set to have an external pressure of 80 psi, which was equivalent to a fluid shear pressure of 26,000 psi inside the interaction chamber.

The microfluidizer was placed in a water bath having a temperature of 5° C., and thus the dispersion was allowed to process with external cooling. The dispersion was cycled at approximately 1 L/minute for a total of 40 minutes in intervals of 10 minutes. 0.27 g of AOT was dissolved in 5 mL of ISOPAR® L (Exxon Mobile) and added to the processing dispersion. All of the materials were collected into a glass storage bottle and the encapsulated particles were characterized by high-resolution transmission electron microscopy (HRTEM) and were analyzed using energy dispersive X-ray spectroscopy (EDS).

HRTEM Characterization

Figure 3B:
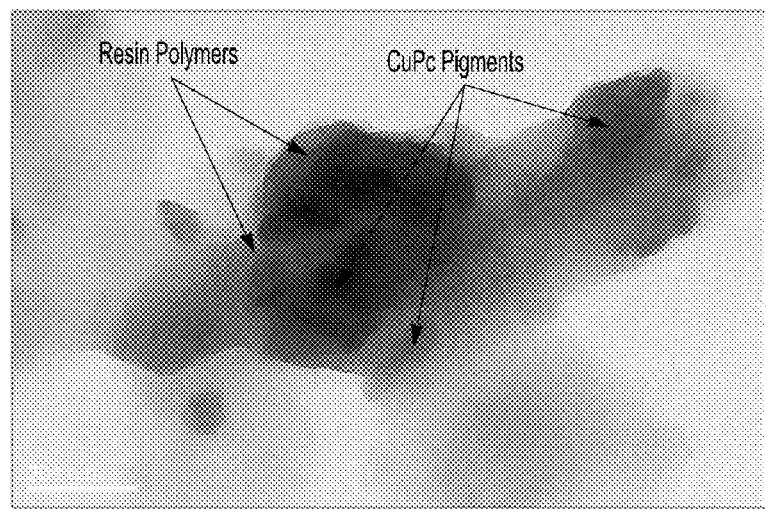

As illustrated in FIGS. 3A and 3B, the CuPc pigments have very characteristic rod-like morphology. These pigments appeared with higher contrast under TEM due to the diffraction of electrons as a result of their poly-crystalline property and density, as pointed out by the arrows in FIGS. 3A and 3B. These images clearly illustrate the encapsulation of the pigments by the polymer resins.

EDS Analysis

Nitrogen is present in CuPc pigments, but is not present in any of the other components used in this example. In EDS, the peaks are exclusive to elements and are known values. In this example, the assignment of peaks was accomplished by the instrument used. The quantitative method used was the Cliff Lorimer thin ratio section, and all elements were analyzed. The report omitted information about the peaks at 8.043 and 8.902 keV.

Figure 4:
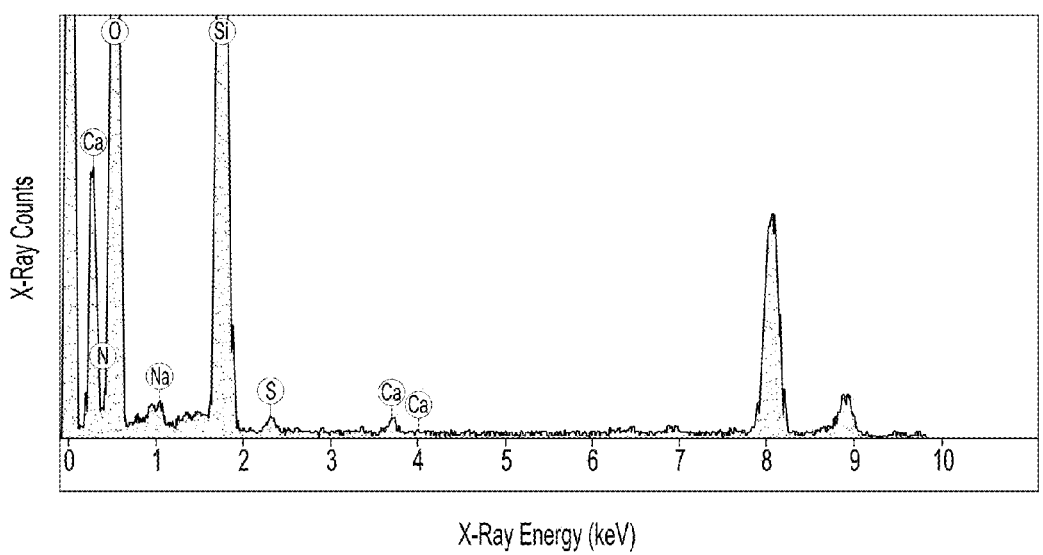
FIG. 4 is a spectrum depicting the energy dispersive X-ray spectroscopy (EDS) analysis of the polymer-encapsulated colorant nanoparticles shown in FIGS. 3A and 3B.

As illustrated in FIG. 4 (where the full scale of x-ray counts was 355 cts) and the following table, nitrogen was detected in the processed dispersion sample. This confirms the presence of the CuPc pigments in the processed dispersion.

TABLE 1

| | EDS Results | | | | | | |
|---|---|---|---|---|---|---|---|
| Element | Peak Area | Area Sigma | K factor | Abs Corrn. | Wt % | Wt % Sigma | Atomic % |
| N | 20 | 110 | 2.965 | 1.000 | 0.14 | 0.76 | 0.20 |
| O | 11652 | 196 | 1.810 | 1.000 | 49.62 | 0.65 | 63.36 |
| Na | 176 | 50 | 1.237 | 1.000 | 0.51 | 0.15 | 0.46 |
| Si | 20658 | 252 | 1.000 | 1.000 | 48.59 | 0.64 | 35.34 |
| S | 245 | 47 | 0.940 | 1.000 | 0.54 | 0.10 | 0.34 |
| Ca | 269 | 40 | 0.935 | 1.000 | 0.59 | 0.09 | 0.30 |

It is to be understood that the ranges provided herein include the stated range and any value or sub-range within the stated range. For example, an amount ranging from about 1 wt % to about 20 wt % should be interpreted to include not only the explicitly recited amount limits of about 1 wt % to about 20 wt %, but also to include individual amounts, such as 2 wt %, 3 wt %, 4 wt %, etc., and sub-ranges, such as 5 wt % to 15 wt %, 10 wt % to 20 wt %, etc. Furthermore, when "about" is utilized to describe a value, this is meant to encompasses minor variations (up to 0.3) from the stated value.

While several embodiments have been described in detail, it will be apparent to those skilled in the art that the disclosed embodiments may be modified. Therefore, the foregoing description is to be considered non-limiting.

What is claimed is:

1. A negatively charged polymer-encapsulated colorant nanoparticle, comprising:
   a colorant nanoparticle core;
   a polymer coating covalently bonded or physically bonded to the surface of the colorant nanoparticle core, the polymer coating having been formed from preformed polymers selected from copolymers of ethylene and methacrylic acid, copolymers of ethylene and acrylic acid, terpolymers of ethylene, methacrylic acid, and acrylate, polyethylene homopolymers, oxidized polyethylene homopolymers, high-density oxidized polyethylene homopolymers, polypropylene homopolymers, copolymers of ethylene and vinyl acetate, copolymers of oxidized ethylene and vinyl acetate, ethylene maleic anhydride copolymers, propylene maleic anhydride copolymers, and combinations thereof;
   a negatively charged functional group present on the surface of the polymer-encapsulated colorant nanoparticle, wherein each negatively chargeable functional group present on the surface of the polymer-encapsulated colorant nanoparticle is negatively charged, the polymer-encapsulated colorant nanoparticle having been formed in situ in a non-aqueous carrier by microfluidization; and
   a charge director to impart the negative charge to the negatively chargeable functional group.

2. The negatively charged polymer-encapsulated colorant nanoparticle as defined in claim 1 wherein the non-aqueous carrier comprises an isoparaffinic hydrocarbon.

3. The negatively charged polymer-encapsulated colorant nanoparticle as defined in claim 1 wherein the glass transition temperature of the polymer-encapsulated colorant nanoparticle ranges from about 50° C. to about 95° C.

4. The negatively charged polymer-encapsulated colorant nanoparticle as defined in claim 1 wherein the colorant nanoparticle cores include at least two different classes of pigment particles.

5. The negatively charged polymer-encapsulated colorant nanoparticle as defined in claim 1 wherein the colorant nanoparticle cores are selected from pigment particles, quantum dots, colloidal particles, and combinations thereof.

6. The negatively charged polymer-encapsulated colorant nanoparticle as defined in claim 1 wherein the negatively charged functional group is selected from a negatively charged carboxy group, a negatively charged sulfonate group, a negatively charged sulfate group, a negatively charged amide group, a negatively charged carbonate group, a negatively charged phosphate group, a negatively charged phosphonate group, and a negatively charged boronate group.

7. The negatively charged polymer-encapsulated colorant nanoparticle as defined in claim 1 wherein the colorant nanoparticle cores comprise quantum dots.

8. The negatively charged polymer-encapsulated colorant nanoparticle as defined in claim 1 wherein the negatively charged functional group is selected from a negatively charged sulfate group, a negatively charged amide group, a negatively charged carbonate group, a negatively charged phosphate group, a negatively charged phosphonate group, and a negatively charged boronate group.

9. An ink, comprising:
 a non-aqueous carrier;
 a dispersant; and
 the negatively charged polymer-encapsulated colorant nanoparticles as defined in claim 1.

10. The ink as defined in claim 9 wherein a loading of the negatively charged polymer-encapsulated colorant nanoparticles in the non-aqueous carrier ranges from about 2% of total solids to about 25% of total solids.

11. The ink as defined in claim 9, further comprising a nucleation agent.

* * * * *